(12) United States Patent
Eastman

(10) Patent No.: US 10,217,033 B2
(45) Date of Patent: Feb. 26, 2019

(54) SYSTEM AND METHOD FOR GENERATING A MAP FROM ACTIVITY DATA

(71) Applicant: Under Armour, Inc., Baltimore, MD (US)

(72) Inventor: Kyler Maxwell Eastman, Austin, TX (US)

(73) Assignee: Under Armour, Inc., Baltimore, MD (US)

( * ) Notice: Subject to any disclaimer, the term of this patent is extended or adjusted under 35 U.S.C. 154(b) by 0 days.

(21) Appl. No.: 15/799,400

(22) Filed: Oct. 31, 2017

(65) Prior Publication Data

US 2018/0053073 A1 Feb. 22, 2018

Related U.S. Application Data

(63) Continuation of application No. 14/658,935, filed on Mar. 16, 2015, now Pat. No. 9,836,672.

(60) Provisional application No. 61/953,540, filed on Mar. 14, 2014, provisional application No. 61/953,541, filed on Mar. 14, 2014.

(51) Int. Cl.
*G06K 9/62* (2006.01)
*G06K 9/46* (2006.01)
*G01C 21/32* (2006.01)

(52) U.S. Cl.
CPC ........... *G06K 9/6296* (2013.01); *G01C 21/32* (2013.01); *G06K 9/469* (2013.01); *G06K 9/6218* (2013.01)

(58) Field of Classification Search
None
See application file for complete search history.

(56) References Cited

U.S. PATENT DOCUMENTS

| | | | |
|---|---|---|---|
| 2005/0288836 A1* | 12/2005 | Glass | G09B 29/106 382/293 |
| 2011/0087715 A1* | 4/2011 | Martens | G01C 21/32 708/200 |
| 2011/0276565 A1* | 11/2011 | Zheng | G01C 21/20 707/724 |
| 2012/0158286 A1* | 6/2012 | Nowak | G01C 21/26 701/410 |
| 2012/0254226 A1 | 10/2012 | Shaw | |
| 2013/0304349 A1 | 11/2013 | Davidson | |
| 2014/0095062 A1 | 4/2014 | Wang | |
| 2014/0244154 A1* | 8/2014 | Modica | G01C 21/3407 701/410 |

\* cited by examiner

*Primary Examiner* — James A Thompson
(74) *Attorney, Agent, or Firm* — Maginot, Moore & Beck LLP

(57) ABSTRACT

A method for generating a graph includes receiving GPS data points for a plurality of GPS tracks. Thereafter, points of greater curvature in the GPS tracks are identified. The method further includes determining a plurality of nodes for the graph based on the identified points of greater curvature in the GPS tracks. Additionally, the method includes determining a plurality of connections between the nodes, the plurality of nodes and the plurality of connections defining the graph.

18 Claims, 11 Drawing Sheets

| POINT | LONG(X) | LAT(Y) | CLOSEST NODE | PATH | MIN SUM ABS. ERROR | CLOSEST POINT |
|---|---|---|---|---|---|---|
| 1 | 0.8 | 0.8 | 5 | 5 | 0 | 1 |
| 2 | 0.75 | 0.75 | 5 |  | 0.1 |  |
| 3 | 0.65 | 0.65 | 2 | 2 | 0.1 |  |
| 4 | 0.6 | 0.6 | 2 |  | 0 | 4 |
| 5 | 0.55 | 0.65 | 2 |  | 0.1 |  |
| 6 | 0.45 | 0.75 | 6 | 6 | 0.1 |  |
| 7 | 0.4 | 0.8 | 6 |  | 0 | 7 |

|  | ACTIVITY 1 | ACTIVITY 2 | ACTIVITY 3 |
|---|---|---|---|
| EDGE 1 (1,2) | 2 | - | - |
| EDGE 2 (2,3) | 1 | 1 | 2 |
| EDGE 3 (2,4) | - | 1 | 1 |
| EDGE 4 (4,5) | 2 | 1 | - |
| EDGE 5 (5,6) | - | 2 | 1 |

|  | NODE 1 | NODE 2 | NODE 3 | NODE 4 | NODE 5 | NODE 6 |
|---|---|---|---|---|---|---|
| NODE 1 | - | - | - | - | - | - |
| NODE 2 | - | - | - | - | - | - |
| NODE 3 | - | - | - | - | 1 | - |
| NODE 4 | - | - | - | - | - | - |
| NODE 5 | - | 1 | - | - | - | - |
| NODE 6 | - | - | - | - | - | - |

FIG. 11

000# SYSTEM AND METHOD FOR GENERATING A MAP FROM ACTIVITY DATA

CROSS-REFERENCE TO RELATED APPLICATIONS

This application is a continuation of U.S. patent application Ser. No. 14/658,935, filed Mar. 16, 2015, which claims priority from U.S. provisional patent application Ser. No. 61/953,540, filed Mar. 14, 2014, and U.S. provisional patent application Ser. No. 61/953,541, also filed Mar. 14, 2014, the entire contents of which are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This document relates to the field of activity tracking systems, and particularly to the creation of maps and graphs based on activity data.

BACKGROUND

The task of generating and updating known routes and trails of human activity is usually performed manually, by at least three different groups, including (a) city, state, and national governmental organizations, such as the USGS, (b) large international companies, or (c) crowd-sourced efforts, such as OpenStreetMap.org. All of these manual approaches rely on explicit agents (such as survey workers, drivers of cars capable of tracking GPS data, or OSM volunteers). These agents must (1) take the time to traverse paths and trails for the purposes of mapping, (2) be diligent enough to transfer their records into a central database, and (3) be sure to record their paths with sufficient accuracy. When the agent fails even on a small scale in any of his or her duties, the resulting maps are less than ideal.

The current manual approaches to generating and updating maps suffer several shortcomings. In some cases, a new path that should be included on a map will not be identified until an agent is deployed to record the path. Consequently, a path may go unrecorded for days, weeks, months, or longer. As another problem, an organization designated to map a region may resist the mapping of "unsanctioned" paths even if such paths are frequently used. For example, an organization may not wish to map backcountry trails if such trails are not sanctioned by a local municipality. This may be due to any of various reasons, such as limited resources that will only allow for the mapping of official trails, or not wanting to promote the use of a particular path (e.g., a dangerous path) by making it more widely known. As another issue with current systems, the accuracy of path representation typically relies on a single agent who is often employed by or paid by the mapping entity.

Accordingly, it would be advantageous to provide a system for obtaining mapping data for use in mapping new paths and also improving upon maps for existing paths. It would also be advantageous if the mapping data could be more quickly obtained and with a greater degree of accuracy. It would also be advantageous if the mapping data could be collected with relatively little expense.

SUMMARY

Embodiments disclosed herein describe a centralized database of global positioning system (GPS) data that can be collected from a group of users, and the GPS data may then be converted into an explicit edge-node graph format. According to one embodiment, the GPS data can be collected as GPS tracks from fitness enthusiasts or other users. Using an aggregate of recorded GPS tracks taken by users, a system of trails can be generated that is more complete and up-to-date than more traditional methods.

Since general public users, such as fitness enthusiasts, frequent parks and trail areas at a much greater rate than any organization can match with explicit agents, they can provide updates to changes in paths that would otherwise go unrecorded for days or months. Moreover, general public users, such as fitness enthusiasts, may frequent paths that are not officially 'sanctioned'. Embodiments discussed herein can utilize such data to map paths that would otherwise go unrecorded.

In accordance with at least one exemplary embodiment of the disclosure, there is provided a method for generating a graph. The method comprises receiving GPS data points for a plurality of GPS tracks, and identifying points of greater curvature in the GPS tracks. The method further comprises determining a plurality of nodes for the graph based on the identified points of greater curvature in the GPS tracks. Additionally, the method comprises determining a plurality of connections between the nodes, the plurality of nodes and the plurality of connections defining the graph.

Pursuant to another exemplary embodiment of the disclosure, there is provided a method for generating a graph. The method comprises receiving GPS data points for a plurality of GPS tracks within a bounded area, clustering the GPS data points, and determining a plurality of nodes for the graph based on the clustered GPS data points. The method further comprises determining a sequence of closest nodes for a plurality of GPS data points for each of the GPS tracks, and then reducing the sequence of closest nodes for each of the GPS tracks by removing redundant nodes from the sequence. In addition, the method comprises determining a plurality of connections between the nodes based on the reduced sequence of closest nodes for each of the GPS tracks.

The above described features and advantages, as well as others, will become more readily apparent to those of ordinary skill in the art by reference to the following detailed description and accompanying drawings. While it would be desirable to provide an activity tracking system that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 7 is an exemplary chart of data used to derive the node/path diagram of FIG. 6;

FIG. 10 illustrates an exemplary embodiment of a path matrix defined by the nodes of the graph of FIG. 9 and a number of activity tracks defined by GPS tracks;

FIG. 11 illustrates an exemplary embodiment of a suggestion box based on data from an activity track not included in the path matrix of FIG. 10.

DESCRIPTION

Activity Tracking System

Figure 1:
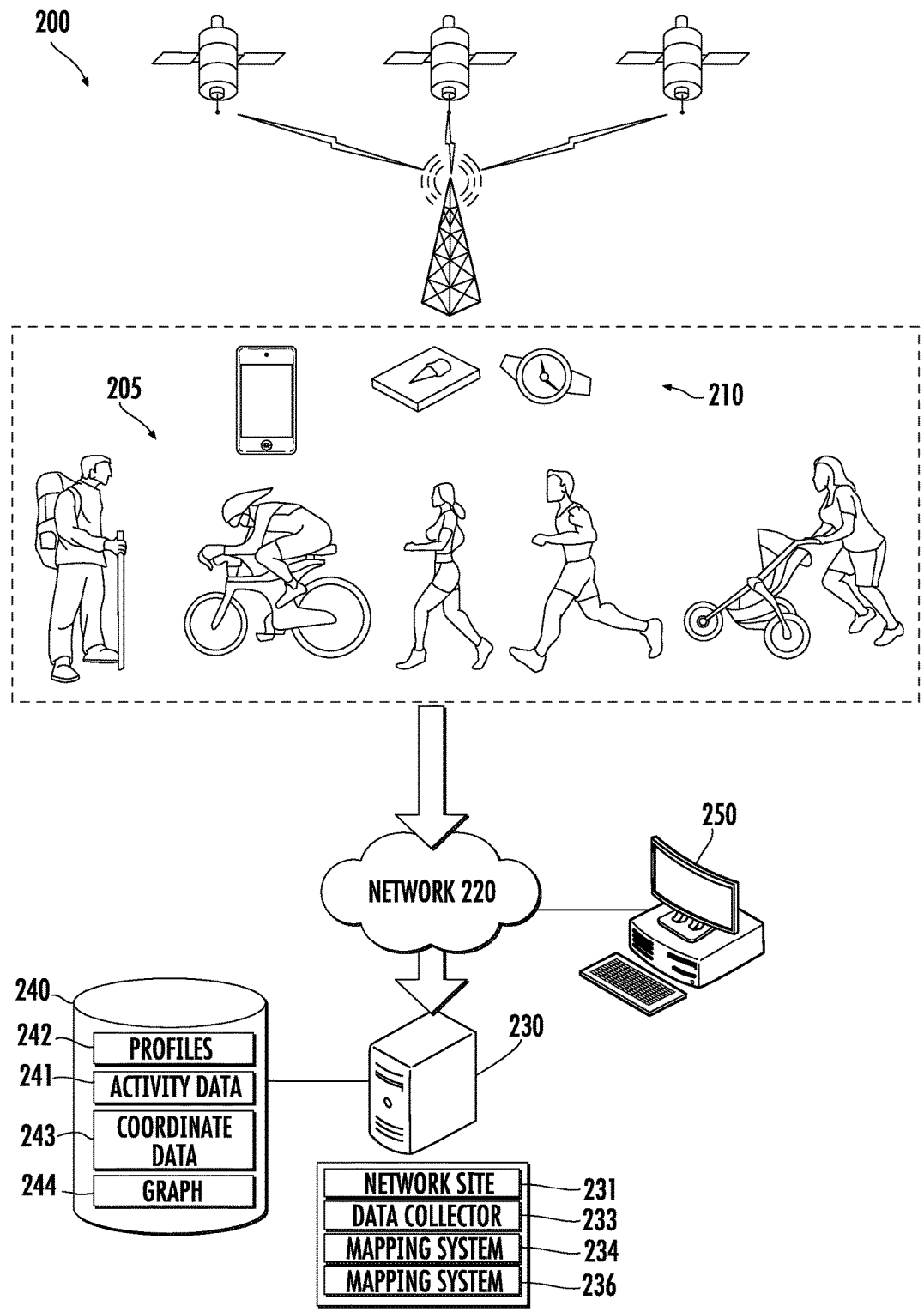
FIG. 1 is a diagram illustrating an embodiment of an activity tracking system configured to provide activity data and generate a map.

With reference now to FIG. 1, a diagrammatic representation of one exemplary embodiment of an activity tracking system 200 is shown. The activity tracking system includes GPS-enabled devices 210 configured for receiving GPS data from the Global Positioning System satellites, sensing and collecting activity data associated with user 205, and sending the GPS data and the collected sensor data to the server 230 over network 220 (e.g., the Internet, cellular network, LAN or other network). Examples of GPS-enabled devices 210 include devices configured with GPS receivers such as smartphones, GPS watches, etc. GPS data may include, for example, timestamp, latitude, longitude, and elevation data. Sensor data may include actual physiological or contextual readings or estimates associated with various physical activities of the user, and such sensor data may be collected or determined in real time or on a regular basis. Examples of sensor data include heart rate, power, motion, movement, speed, range, acceleration data, etc. The GPS-enabled devices 210 may also be configured to collect the sensor data and display or transmit the sensor data. The term "activity data" as used herein refers to one or both of GPS data and sensor data. Activity data may be collected during the course of human fitness activities. The term "fitness activity" refers to human movement associated with physical fitness, including running, jogging, walking, human powered cycling, or similar human powered activity.

In one embodiment, activity tracking system 200 may comprise a computing device (i.e., one or more computing devices), such as a server 230 (including a plurality of servers) configured to perform a plurality of functions embodied in various subsystems including, but not limited to, network site 231, data collector 233, graphing system 234 and graph encoding system 236. Those skilled in the art will appreciate that the example shown in FIG. 1 is non-limiting and that configuration of activity tracking system 200 may vary from implementation to implementation.

With continued reference to FIG. 1, the GPS data may be received and stored by GPS-enabled devices 210 during an activity by a user (e.g., walking, jogging, running, biking, etc.). This GPS data provides the geographic information of the recorded activity (e.g., latitude and longitude data). The user may optionally record other data, such as the user's heart rate or power, at a varied sample rate (e.g., 1-100 Hz or other rate) depending on the activity type, and any additional information (e.g., cadence, stride rate, etc.) as appropriate, depending on the particular GPS-enabled device that is used.

When an activity is completed by the user, the user instructs the device to send the recorded activity data over network 220 to the server 230. This can be sent directly if the device (such as a smartphone) has the capabilities. Otherwise, the device may be linked to a networked computer in order to deliver data. In other embodiments, the data may delivered real time or near real time using any of various networks.

The device 210 can provide this time series data for the activity, create a data file that is temporarily stored in memory, and send the data file. An example of activity data is provided in table 1, below. The activity data for the activity may include GPS data and sensor data (e.g., altitude data, acceleration data, heart rate data, or any of various other types of sensor data or other data).

TABLE 1

| timestamp | latitude | longitude | other (ex. heart rate) |
|---|---|---|---|
| 1.043567 | −97.3453452345 | 35.234523456 | 150 |
| 2.2345 | −97.3336362255 | 35.231213451 | 151 |
| 3.2345452 | −97.3336234534 | 35.193245234 | 150 |
| 4.234535 | −97.3434560120 | 35.225234623 | 150 |

According to one embodiment of the activity tracking system 200, activity data may be forwarded to the server 230 over the network 220 by a mobile application that may identify a user associated with the GPS data and an indicator that the activity data is associated with a workout, a type of activity (e.g., running, cycling, rowing or other activity). Network site 231 can provide a site accessible over a network such as the Internet or other network with an interface, such as an API, REST interface, thick client interface or other interface to allow GPS-enabled devices 210 or other client devices to interact with activity tracking system 200 to provide activity data and receive information.

Data collector 233 is configured to store the received activity data in a data store 240 as activity data 241. Furthermore, activity tracking system 200 may maintain profile data 242 for users, such as demographic information. Profile data 242 may include, by way of example but not limitation, age, gender, height, weight, preferences, performance level (e.g., beginner, intermediate, professional, etc.) or other information. Activity data 241 and profile data 242 may be stored such that GPS tracks (i.e., traversals of a particular street or path network defined by time-series GPS data) are associated with workouts (e.g., by unique work ids), users, dates and other information. Thus, data store 240 may store a large amount of activity data associated with users and workouts.

As discussed in further detail below with reference to FIGS. 3-8, mapping system 234 can analyze GPS tracks (such as GPS tracks of activity data 241) and construct a graph 244 which is stored in memory of the data store 240. The constructed graph 244 can be used as a graph of the activity tracking system 200, such as the graph of the existing street network as described in further detail with reference to FIG. 9. Mapping system 234 may create a visual representation of graph 244 as a map that can be viewed on a client device such as a GPS-enabled device 210 or client device 250.

Activity Tracking System within a Network Computing Environment

Figure 2:
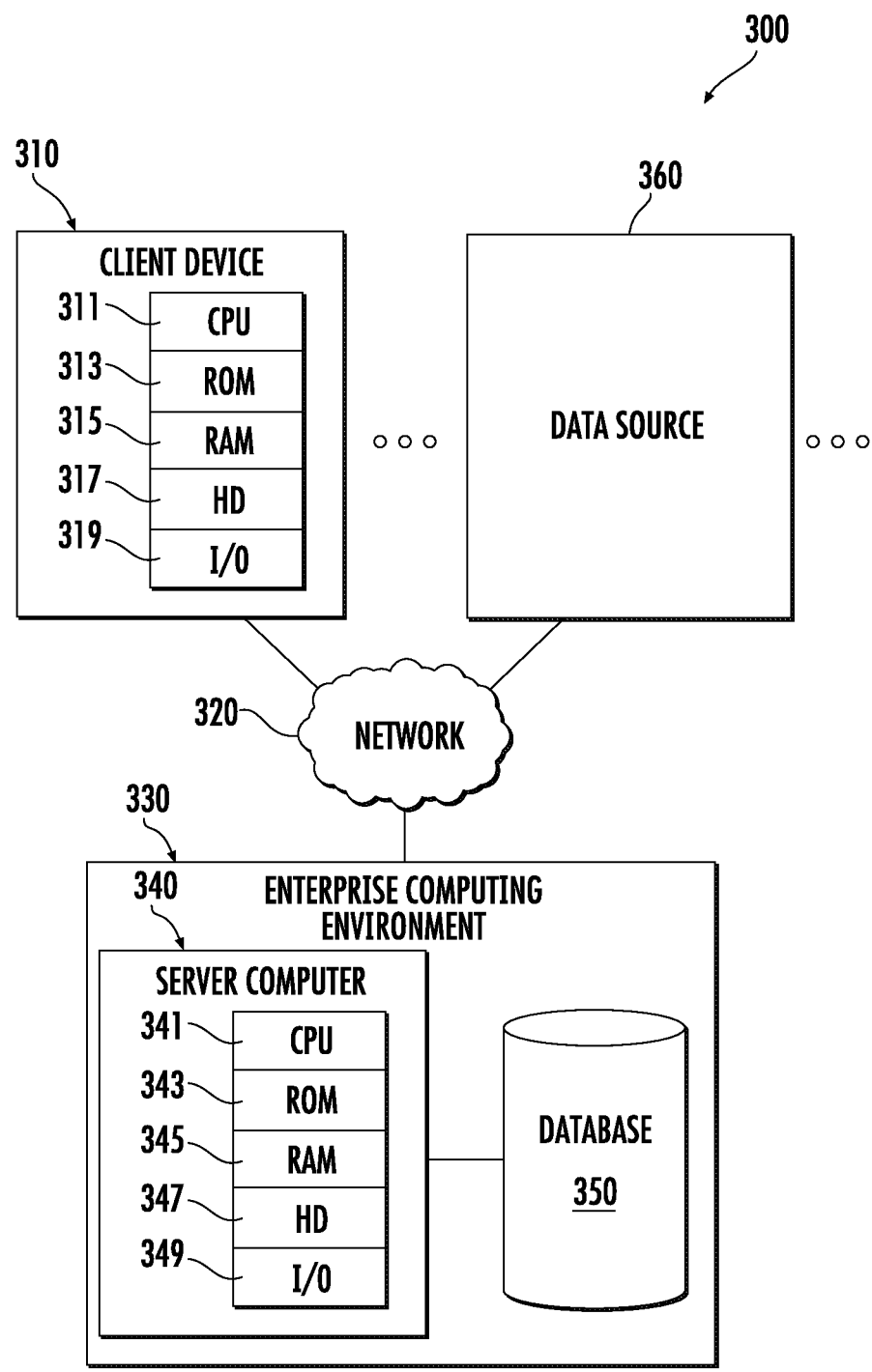
FIG. 2 is a diagram of a computer network computing environment including a client computer and a server computer for the activity tracking system of FIG. 1.

With reference now to FIG. 2 a diagrammatic representation of one embodiment of a network computing environment 300 is shown that may be used to implement the activity tracking system 200. For purposes of clarity, a single client computer, a single server computer, and a single data source are shown in the figure. The client and server computers and data source represent an exemplary hardware configuration of data processing systems that are capable of bi-directionally communicating with each other over a public network such as the Internet. Those skilled in the art will appreciate that network computing environment 300 may comprise multiple server computers, and multiple client computers and data sources may be bi-directionally coupled to enterprise computing environment 330 over network 320.

Client computer 310 is a GPS-enabled device, such as GPS-enabled device 210 described previously with reference to FIG. 1. The client computer 310 can include central processing unit ("CPU") 311, read-only memory ("ROM") 313, random access memory ("RAM") 315, ("HD") or storage memory 317, and input/output device(s) ("I/O") 319. I/O 319 can include a keyboard, monitor, printer, and/or electronic pointing device. Example of I/O 319 may include mouse, trackball, stylist, or the like. Client computer 310 can include a cellular phone, a smart phone, a GPS phone, or any device capable of geo-tagging and communicating over a network.

Server computer 340 may have similar hardware components including CPU 341, ROM 343, RAM 345, hard drive 347, and I/O 349. Data source 360 may be a server computer having hardware components similar to those of client computer 310 and server computer 340, or it may be a data storage device. Server computer 340 may provide one embodiment of an activity tracking system.

Figure 9:
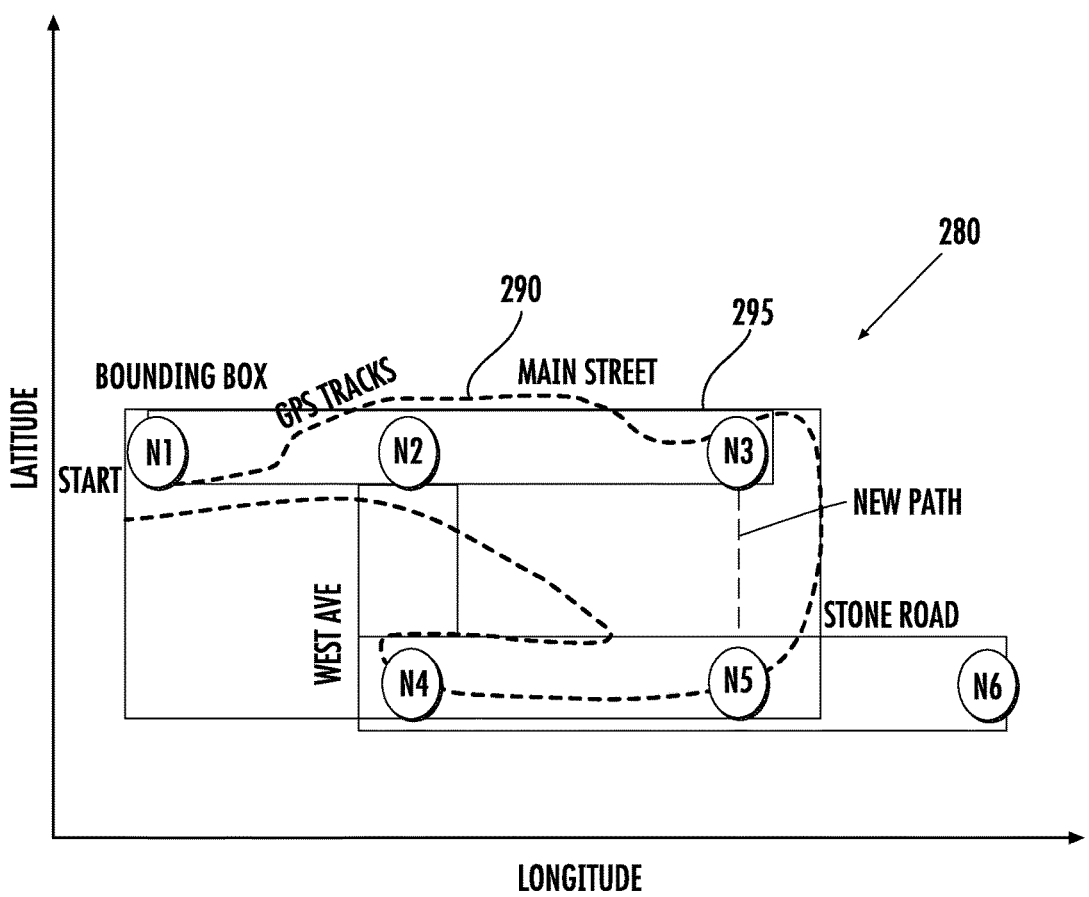
FIG. 9 is an exemplary diagram illustrating an exemplary GPS track of a user of the activity tracking system of FIG. 1, the GPS track mapped to a graph including a plurality of nodes.

Each computer 310 and 340 shown in FIG. 9 is an example of a data processing system. ROM 313 and 343, RAM 315 and 345, storage memory 317 and 347, and database 350 can include media that can be read by CPU 311 and/or 341. Therefore, these types of computer memories include computer-readable storage media. These memories may be internal or external to computers 310 and/or 340.

Generating a New Graph from GPS Tracks

Figure 3:
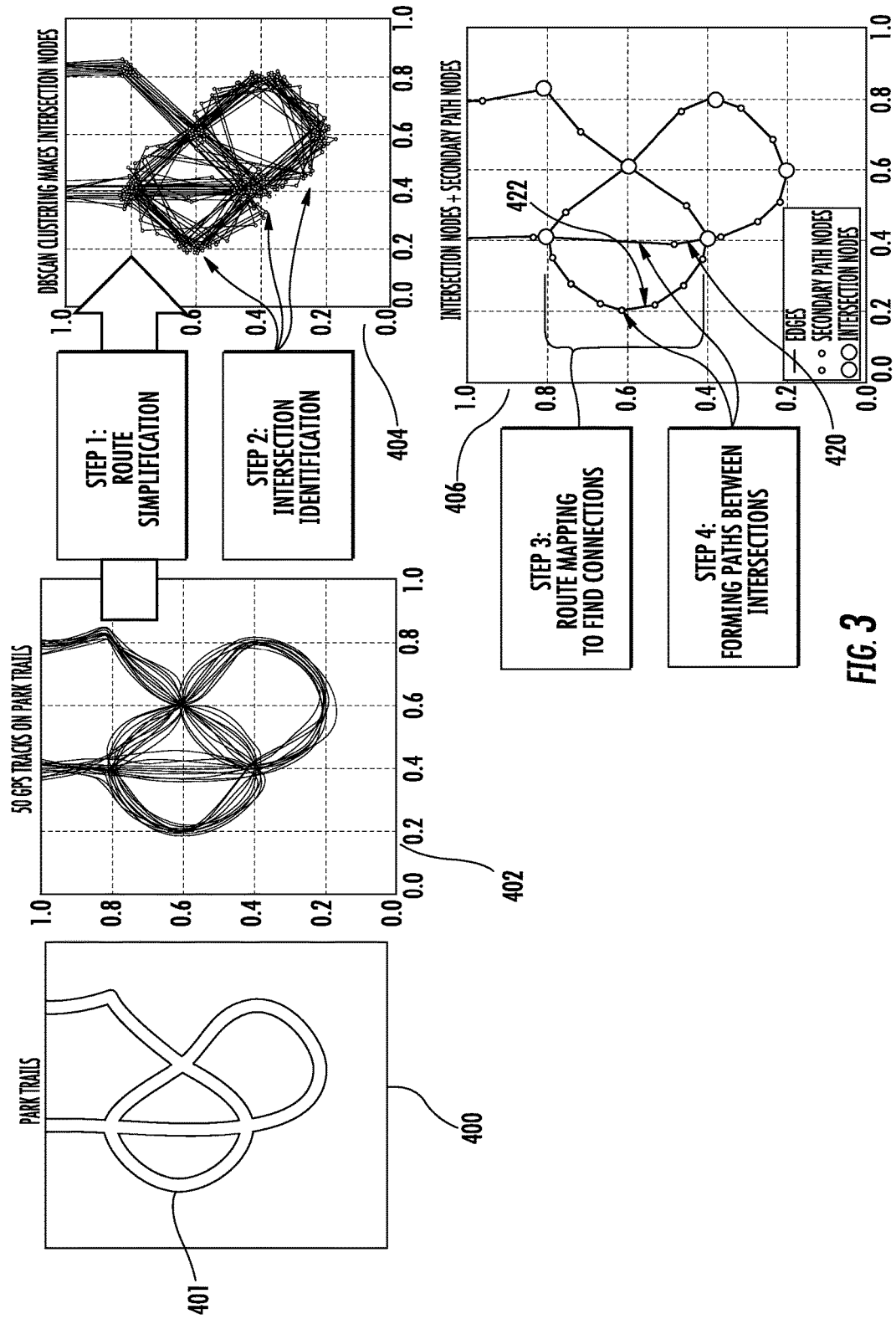
FIG. 3 is a diagram illustrating one embodiment of a method for generating a graph for a map from activity data using the activity tracking system of FIG. 1.
Figure 8:
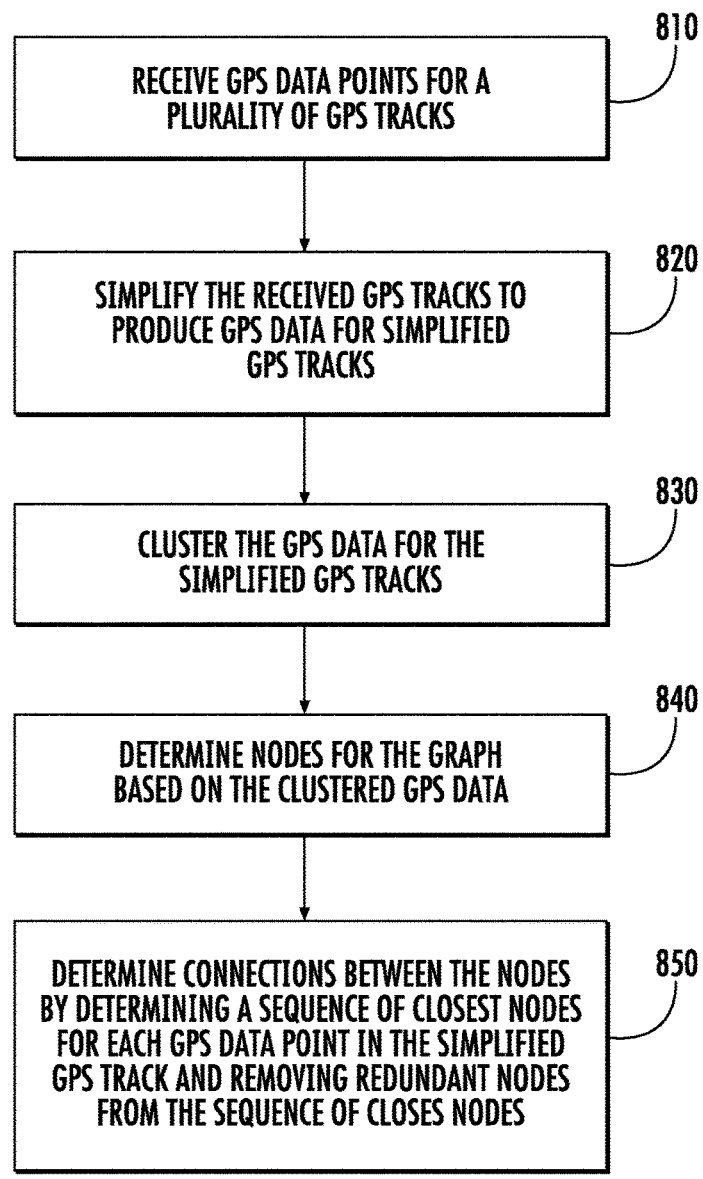
FIG. 8 is a flowchart of a method of generating a map from activity data.

FIG. 3 is a diagram providing a visual example of one embodiment of a method of generating of a graph from aggregate GPS tracks. FIG. 8 provides a flowchart further defining the method of FIG. 3.

As shown in FIG. 3, a visual representation of a previously unmapped trail is shown at diagram 400. The shape on the chart 400 represents a path network 401 that is all or part of a park trail. The path network 401 is an existing network of interconnected paths that is defined in some manner, such as dirt trails through the woods, a mulched or gravel trails, paved paths or roads, or any of various other defined routes. Such routes may be intended as walkways for foot traffic, or roads for bicycles, motor vehicles, or other vehicular traffic.

GPS Data Collection

When users with GPS-enabled devices traverse the path network 401, the users create time series GPS data. The GPS data includes longitude and latitude data that is collected by the GPS-enabled device 210 and transmitted to the server 230 of the activity tracking system 200 (in real-time or as recorded data) for further processing. Such transmission of GPS data typically occurs wirelessly (e.g., over a cellular telephone network, via rf transmission to an internet computer, etc.), but such transmission may also be transmitted in other forms, such as a wired connection when a GPS-enabled device 210 is connected to a computer over a wired connection.

Figure 4:
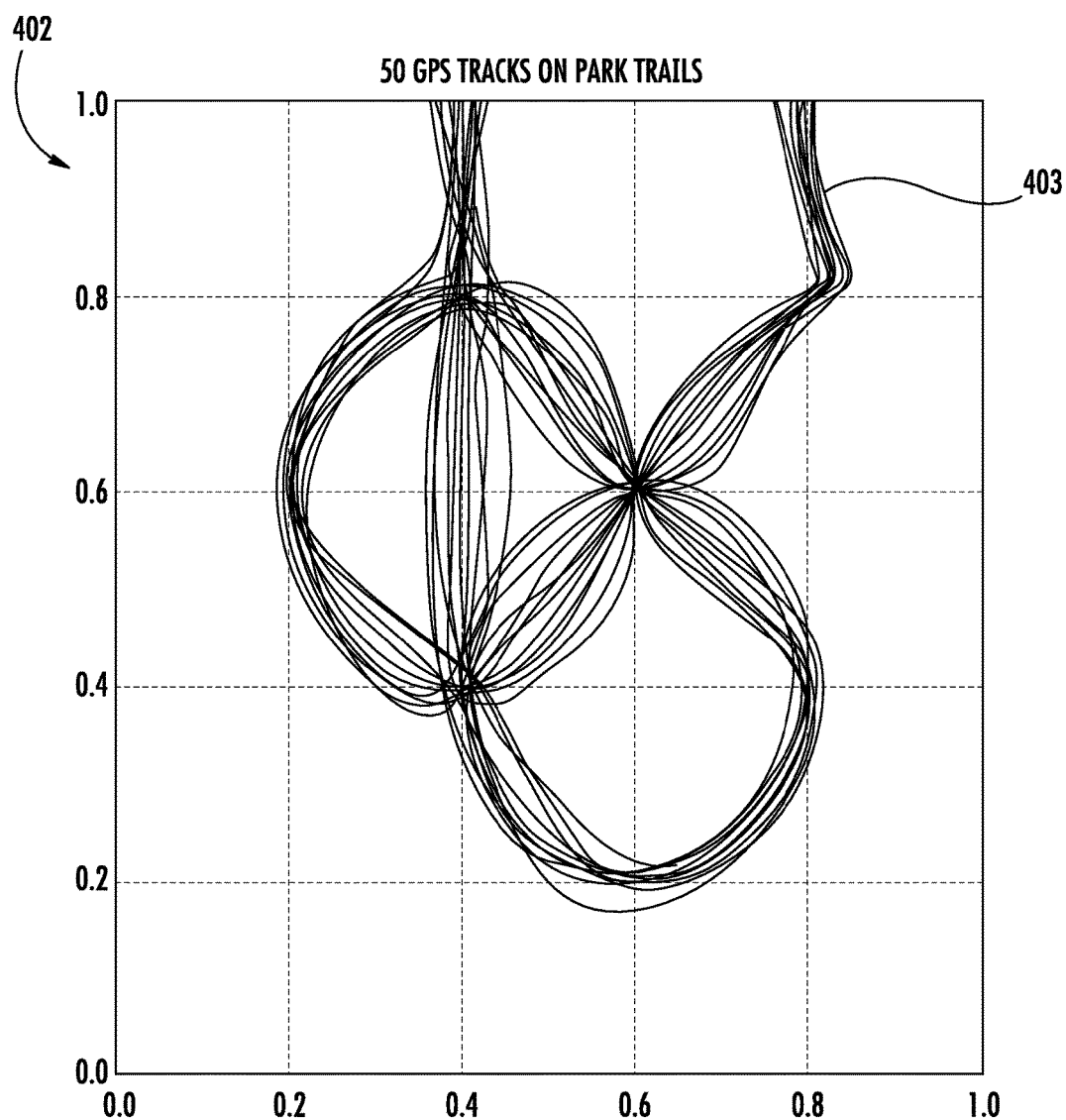
FIG. 4 is an exemplary map derived from a plurality of GPS tracks acquired using the activity tracking system of FIG. 1.

With particular reference to FIGS. 3 and 4, GPS data for a number of users traversing path network 401 includes a number of GPS data points 403 as shown on graph 402 of GPS data. Each point on the graph 402 represents a GPS latitude/longitude combination from one of a plurality of GPS tracks recorded by a user. As shown in the graph 402, most GPS data points 403 are defined within the confines of the actual path network 401. However, a number of GPS data points may fall outside of the actual path network 401. GPS data points falling outside of the actual path network 401 may be the result of users straying from the defined path for any of various reasons, or may be the result of GPS error. As used herein the term "GPS track" refers to a series of GPS data points within a bounded area over some period of time, the GPS data points thereby defining a path of traversal for the user over the period of time.

Route Simplification

Figure 5:
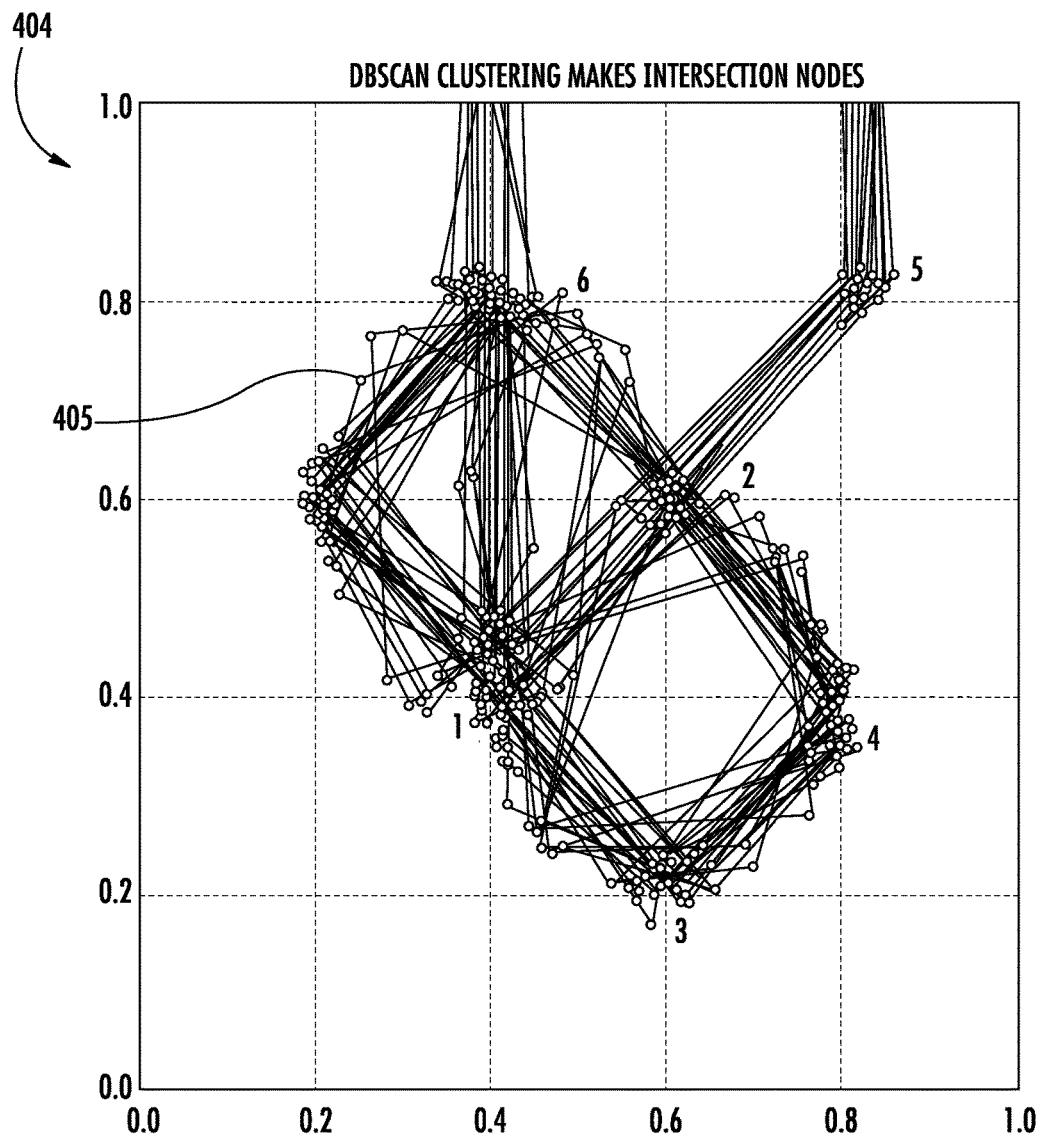
FIG. 5 is an exemplary map with simplified data derived from the map of FIG. 4.

With continued reference to FIG. 3 along with reference to FIG. 5, a route simplification process is performed on each of the time-series tracks of interest to determine areas of greater curvature. According to one embodiment, areas of greater curvature can be found using the Ramer-Douglas Peucker (RDP) algorithm. If any of the GPS data in a GPS track has distance intervals that are highly diverse (such as greater than a configurable amount such as 10 meters or greater), the tracks' latitude and longitude may be re-sampled with interpolated points that are evenly spaced, at about 10 meter intervals or other distance. RDP can be applied to the latitude and longitude components on the GPS track as a function of a parametric time variable (which in some cases may be a dummy variable). As shown in the diagram 404 of FIG. 5, this can produce a simplified version of each GPS track, with points only at the places with the most curvature, as represented by the points in simplified data 405.

In order to produce the simplified data 405 for the GPS tracks, an appropriate error parameter for an iterative end-point fit algorithm such as RDP is selected. RDP is then applied to each GPS track. Thus, for each GPS track, a line is defined extending between two points of a subset of GPS data points for the GPS track, and a point of the subset that is a farthest distance from the defined line is determined. The determined point from the RDP algorithm is maintained as a point of greater curvature if the farthest distance is greater than the defined error parameter. If the selected error parameter is too low, RDP will reproduce the GPS track entirely. On the other hand, if the selected error parameter is too great, RDP will oversimplify the track. This error parameter can be estimated empirically and the value applied may be dependent on the particular sport. For example, cycling, running, and walking GPS tracks generally produce tracks with different amounts of curvature (e.g., cycling<running<walking).

Primary Node Identification

The points of greater curvature extracted in Route Simplification process described above can be grouped according to a clustering algorithm. Groups of clustered data points may be identified as primary nodes in the graph. According to one embodiment, a density-based spatial clustering of applications with noise (DBSCAN) or other algorithm that does not require prior estimation of the number of clusters can be used, though other suitable algorithms may also be employed. Using the simplified data of diagram 404 of FIG. 5 as an example, a DBSCAN analysis results in six clusters of curvature points. These six clusters of curvature points are labeled as nodes N1-N6 in the diagram 406 of FIG. 6 (and FIG. 3). The DBSCAN algorithm relies on two parameters: (1) a maximum distance for a sample to be included in a particular cluster, and (2) the minimum number of samples for a cluster to exist (best expressed as a percentage). The proper choice of parameters between route simplification and intersection identification are inherently linked, and dependent on the amount of local noise. The parameters may be developed through empirical testing of GPS routes over known trails. If the parameters are too broadly defined, too many nodes may result for the graph. On the other hand, if the parameters are too narrowly defined, an insufficient number of nodes may result for the graph.

It has been determined that places on the diagram having greater amounts of curvature naturally tend to occur at intersections. As such, places of greater curvature can be used as the location of nodes in an edge-graph. The exemplary node/path diagram 406 of FIG. 6 includes six nodes 410 (labeled N1-N6), each node 410 corresponding to a cluster. As illustrated in the node/path diagram 406 of FIG. 6, a node 410 can be defined for each cluster of simplified data 405 (shown in FIG. 5). Each node 410 may have a defined latitude and longitude (which may be a point defined at the center of each cluster) and may also have other associated data, such as elevation or other information. While many nodes represent intersections, in some cases, route simplification and intersection identification can produce primary nodes that do not represent intersections, which is also acceptable. For example, in FIG. 6, nodes N3, N4 and N5 on the node/path diagram 406 are not intersections, but are places on the diagram which exhibit a threshold amount of curvature (e.g., as defined by the selected DBSCAN parameters).

Route Mapping

The term "edge" as used herein refers to a connection (e.g., a line segment) between nodes 410. Edges 412 connecting the nodes can be identified based on the defined nodes. To accomplish this, for each GPS track from the original dataset, the closest node and an error value to that node can be calculated. For example, if one were to take a route from node N5 to node N2 to node N6 (i.e., path (5, 2, 6)) in the graph of FIG. 6, the GPS track will include a collection of GPS points as illustrated by columns 1-3 of FIG. 7 (including point number, latitude, and longitude information). Various pieces of information may be associated with each of the GPS points, including the closest node to each point on the graph 406. Determination of the closest node may be accomplished based on distance measures. In at least one alternative embodiment, the closest node is determined more efficiently by calculating the sum the absolute errors for all nodes, and selecting the node with minimum error. In any event, after a closest node is calculated for each point, a sequence of nodes is produced, as shown in column 4 of the table of FIG. 7. This resulting sequence of nodes includes many nodes that repeat, as two consecutive GPS data points are likely to be close to the same node. When the same node appears in series, redundant points in the series can be removed. Thus, for example, column 4 of FIG. 7, which includes the sequence of closest nodes 55,222,66 can be reduced to produce a sequence of closest nodes with redundant nodes removed, particularly 5,2,6, as shown in column 5 of FIG. 7. This sequence of closest nodes with redundant nodes removed defines a path for the GPS track. This process can be repeated for all the GPS tracks.

After redundant nodes are removed from the closest node sequences for each GPS track, all possible connections between nodes will be identified. In particular, an edge may be identified as any two consecutive nodes in any defined path for a GPS track. In at least one embodiment, an edge is not defined unless a minimum number of GPS tracks define the edge. For example, if only one or two GPS tracks identify an edge between nodes N5 and N6, the system may ignore these edges as being the result of GPS error or GPS tracks taken by users who strayed from the defined path.

It should be noted that if two entries for a node are separated by another node in the series, entries may not be redundant. For example the series of nodes 55555,22222, 66,222,44444,222222,5555 may be reduced to the path 5,2,6,2,4,2,5. Within this series, node N2 should be recognized as a node in the path at least three times, even though only two GPS points closest to node N6 appear in the series of nodes, and these are the only two GPS points separating the string of five node N2 entries (i.e., 22222) and the following string of three node N2 entries (i.e., 222).

Creation of Edge-Node Graph

An edge-node graph can be specified as a matrix G, where $G_{ij}$ will be nonzero only where there is a connection between the $i_{th}$ and $j_{th}$ node (which connection may be referred to herein as an edge). The path data for the GPS tracks can be used to determine the sum of all the edges, so that $G_{ij}$ will represent every time that edge was traversed amongst all the data tracks considered, so that, for example, the matrix may encode a count of traversals for each edge. Since some of the smaller values might represent GPS error or times when people were walking outside a path, one embodiment may remove edges that were traversed over a configurable threshold number of times.

Figure 6:
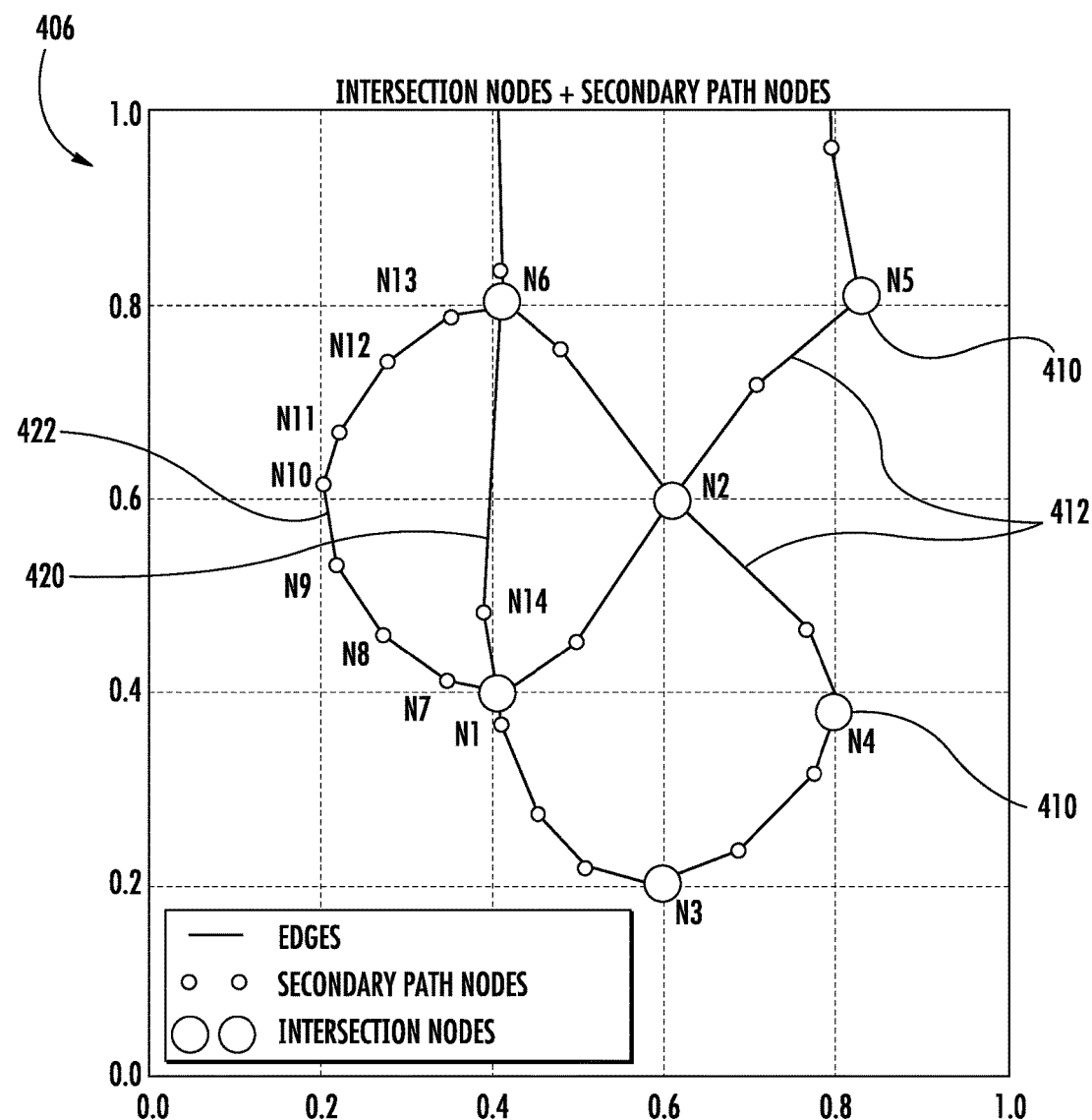
FIG. 6 is an exemplary node/path diagram derived from the map of FIG. 5.

As discussed previously, nodes 410 and edges 412 may be determined from the GPS tracks. As shown in FIG. 6, the GPS tracks define a graph including nodes 410 and edges 412. The nodes 410 include nodes one through six (N1-N6), and the following edges 412 between the nodes: (1,2)(1,3) (1,6),(2,6),(2,5),(2,4),(3,4), where each ordered pair defines a connection between two nodes. In this embodiment, each edge is an ordered pair for an undirected graph (e.g., edge (1,2) defines a connection from both N1 to N2 and from node two to node 1). In other embodiments, a directed graph can be created (e.g., edge (1,2) defines the path from node one to node two and edge (2,1) defines the path from node two to node one).

With reference now to FIG. 8, a method of creating an edge-node graph is described. The method includes receiving a plurality of GPS tracks from GPS-enabled devices, as shown in block 810 of FIG. 8. As described previously, the GPS-enabled devices 210 are carried by users that collect the GPS tracks from a particular activity session. Each GPS track includes a time-series of GPS data points, each GPS data point including at least latitude and longitude information. In at least some embodiments, additional information (e.g., altitude information) may also be associated with each GPS data point. Each GPS data point of a GPS track may be transmitted from the GPS-enabled device to the network 220 in real time or following the completion of an activity session. The transmitted GPS tracks are received at a computer of the network computing environment, such as server 230 of FIG. 1. An exemplary embodiment of a graph showing GPS data points 403 from a plurality of GPS tracks is shown in FIG. 4.

As noted in block 820 of FIG. 8, the received GPS tracks are processed with a route simplification procedure. For example, the GPS tracks may be processed with an RDP algorithm that results in the simplified data for the GPS tracks (e.g., fewer data points). FIG. 5 shows an exemplary graph of simplified data 405 based on the GPS data points 403 for the GPS tracks of FIG. 4. This simplified data not only reduces the required amount of data to be stored by the activity tracking system 200, but also facilitates further processing of the data to define an edge-node graph. For example, using the RDP algorithm, the simplified version of a given GPS track results in points only at those locations on the GPS track with the most curvature.

As shown in block 830 of FIG. 8, the points of simplified GPS tracks from block 820 may be grouped according to a clustering algorithm. Using the simplified data with data points provided only at locations on the GPS tracks with the most curvature will result in a clustering of points at the locations of the most curvature. For example, in the diagram 404 of FIG. 5, six clusters of GPS data points are identified at locations of the most curvature for the GPS track. The GPS data points at the locations of most curvature are typically intersections on the graph, but may also simply be locations where a path changes direction.

After the simplified GPS data points are clustered and intersections are identified, the intersections are defined as nodes on the graph, as shown in block 840 of FIG. 8. Each node 410 may have a defined latitude and longitude (which may be a point defined at the center of each cluster) and may also have other associated data, such as elevation or other information. As noted previously, while many nodes represent intersections, in some cases, route simplification and intersection identification can produce nodes that do not represent intersections. For example, in FIG. 6, nodes N3, N4 and N5 on the node/path diagram 406 are not intersections, but are places on the diagram identified as locations of greater curvature.

As shown in block 850 of FIG. 8, after the nodes are identified, the network of paths for the graph may be identified. The network of paths is defined by connections (or "edges") between the nodes. To identify these connections, each GPS data point in a GSP track is analyzed to determine a closest node to the GPS data point and an error value to that node. For example, with reference to FIGS. 6 and 7, if one were to take a route from node N5 to node N2 and then to node N6 (i.e., path (5, 2, 6)) in the graph of FIG. 6, the GPS track will include a collection of GPS points as illustrated by columns 1-3 of FIG. 7 (including point number, latitude, and longitude information). After a closest node is calculated for each point, a sequence of nodes is produced, as shown in column 4 of FIG. 7. This resulting sequence of nodes includes many nodes that repeat. The general path of the GPS track can be determined by removing any repeating nodes in the sequence of nodes, as illustrated in column 5 of FIG. 7. Column 5 of FIG. 7 generally shows that for the identified GPS track, the path taken by the user was from node N5 to node N2 and then to node N6 (i.e., (5,2,6)). This sequence of closest nodes with redundant nodes removed defines a path for the GPS track. In this example, the path includes three nodes (i.e., N5, N2 and N6) with two edges on the path (i.e., (5,2) and (2,6)). This process can be repeated for all the GPS tracks in order to identify all possible connections between nodes.

With the nodes 410 and the edges 412 identified as described with reference to blocks 810 to 850 of FIG. 8, a graph is defined. As explained in further detail below, additional processing may occur to further define the graph. For example, in at least one embodiment secondary connecting paths may be defined between nodes by identifying additional locations of greater curvature along an edge. An exemplary process for forming such secondary connecting paths is described in further detail below. In addition, as users transmit new GPS tracks traversing an already defined graph, additional nodes and edges between the nodes may be identified. An exemplary process for identifying such additional nodes and edges between nodes is also described in further detail below.

Forming Secondary Connecting Paths

In some cases, there may be multiple paths between two nodes. For example, in FIG. 6, GPS data shows that there are two possible paths between nodes N1 and N6, including a relatively straight first path 420, and a relatively curved second path 422. To determine a number of paths between nodes, the time series data that traverses an edge can be analyzed and clustered.

In one embodiment, for all GPS tracks that traverses an edge, a row can be formed in a matrix, with the row having resampled GPS track data. The resampled GPS track data may be evenly interpolated to have the same number steps between nodes (i.e., both longitude (x) and latitude (y) can exist on the same row). Thus, for example, each GPS track traversing edge (1,6) can be interpolated to have the same number of points between node N1 and node N6. In this high dimensional space, a clustering algorithm can be applied to the entire matrix to group them into distinct paths, as described in the following paragraphs.

The interpolated GPS tracks can be clustered. Since the number of paths between nodes is likely to be small (e.g., less than 6, as a typical node defined at two crossing paths would include 4 edges extending from the node), a K-means algorithm can be applied for each of the clusters (e.g., 1-6 or other predefined number). A Bayesian Information Criterion or Akamai Information Criterion can be applied to each result to determine the appropriate number of clusters. The centroids of N clusters will represent the appropriate number of average paths between each edge. Other clustering algorithms may also be used. For example, a DBSCAN analysis may be performed on the interpolated GPS tracks to provide an additional number of clusters. If a DBSCAN analysis is performed again the selected parameters may be more broadly defined in order to obtain additional nodes that were not identified as primary nodes.

An example of the above may be taken from the GPS data shown in FIGS. 4-6. The GPS data for each GPS track between node N1 and node N6 can be interpolated into the same number of points and the interpolated GPS data clustered. In this example, this results in two clusters of interpolated GPS data between node 1 and node N6. The first cluster is used to determine the first path 420, and the second cluster is used to determine the second path 422. In at least one embodiment, the mean for each point for the interpolated GPS track for each cluster can be determined to arrive at a mean path for each cluster. Thus, the mean of interpolated GPS data in one cluster can be determined to arrive at the mean path for the first path 420 between node N1 and node N6, and the mean of interpolated GPS data for the second cluster can be determined to arrive at the mean path for a second path 422 between node N1 and node N6.

RDP can be applied to the mean paths to determine intermediate nodes for the secondary paths. With reference to FIG. 6, applying RDP to path 422 results in seven intermediate nodes (N7, N8, N9, N10, N11, N12, N13) and applying RDP to path 420 results in one intermediate node (N14). Since nodes N1-N6 are referred to herein as "primary nodes", nodes N7-N17 may be referred to herein as "secondary nodes" or "intermediate nodes".

The existing $G_{ij}$ can be updated with additional nodes and edges as necessary. For example, in FIG. 6, the edge (1,6) produced two paths. Accordingly, additional edges (including intermediate nodes N7-N14) would be added to graph G, and the edge (1,6) would be replaced with the following edges (for an undirected graph):

path 1: (1,7), (7,8),(8,9),(9,10),(10,11),(11,12),(12,13), (13,6)

path 2: (1,14),(14,6)

Detection of New Edges and Nodes

In addition to creating new graphs (defined by nodes and edges) and determining a number of connection paths between nodes, embodiments discussed herein are also configured to detect new edges or nodes with an existing edge-graph, as discussed below with reference to FIG. 9. Furthermore, the operations discussed above can be performed on new GPS tracks traversed on an existing graph in order to determine if the new GPS tracks result in the same edges or nodes as the existing graph.

Analysis of GPS tracks may comprise performing simplification and intersection detection on the GPS tracks, as described above, in order to identify additional nodes. Analysis of GPS tracks may also comprise route mapping to identify additional edges, as discussed above. GPS track data may also be analyzed to determine multiple paths between existing nodes or newly identified nodes, as also discussed above.

Elevation

In some instances, paths may be most easily determined not by latitude or longitude, but by elevation. For example, the use of drones, especially among private citizens, may require differentiation of their paths versus ground-based vehicles. Accordingly, the above process is expandable to the use of elevation. The operations discussed above can use elevation as an additional dimension.

Non-Human Agents

GPS tracks can be collected from a variety of sources including, but not limited to animals, drones or other sources. For example, it may be easier to track animal paths using GPS trackers attached to the animals rather than collecting data from human users.

Building Upon an Existing Graph

As discussed above, the graphing system 234 is configured to construct a graph 244 from a set of coordinate data 243 (which may also be referred to herein as "map data"). The map data 243 may be provided from data associated with GPS tracks received by the data store 240, as described above, or may be provided from other sources. According to one embodiment, map data 243 can be a set of latitude and longitude coordinates for streets with coordinates appearing at each intersection. For example, U.S. census publishes a database of latitude and longitude sequences for every street recorded, with nodes appearing at every intersection. (Topologically Integrated Geographic Encoding and Referencing files available from United States Census Bureau). Graphing system 234 can analyze the map data and build a network by assuming that overlapping streets with nodes within a very small value (such as a meter or other value) represent an intersection, and mark each of these nodes with a single unique value. Though this does not contain explicit directionality or connectivity between nodes (one-way streets, overpasses), this type of connectivity can be inferred from user behavior, as explained in further detail below. Alternatively, OpenStreetMap.org (www.OpenStreetMap.org) regularly publishes more complete datasets with explicit connectivity. Map data 243 may also include files from other sources.

The graphing system 234 is configured to construct a graph from map data 243 for any sized region as selected by an administrator. In some cases, separate graphs may be maintained for different regions of interests. For example, different cities may be represented in different graphs. In another embodiment, a single graph may be used for all regions.

A simplified example of a region with a street network 280 of interest for which a graph is to be created is illustrated by the street network of FIG. 9. As shown in FIG. 9, map data for a road system may include the following data for a simplified example:

Main Street: Lat=y1, Lon=x1; Lat=y1, Lon=x2; Lat=y1, Lon=x3;

Stone Road: Lat=y2, Lon=x2; Lat=y2, Lon=x3; Lat=y2, Lon=x4;

West Ave: Lat=y2, Lon=x2; Lat=y1, Lon=x2

Other information may also be included such as altitude, etc. The data can be mapped to a series of nodes and edges. The nodes are specific points on the map. The nodes are typically crossing points, but are not necessarily crossing points on the map. The edges are connecting paths or lines between the nodes.

In FIG. 9, the example street network can be described as a list of labeled nodes (labeled N1-N6), the positions of those nodes (a latitude, longitude coordinate for each node), and list of edges extending between the nodes, with each edge represented as with an ordered pair of nodes:

G=(1,2), (2,3), (2,4), (4,5), (5,6)

where G is a graph describing the example street network of FIG. 9 (i.e., the nodes and connections that define the route segments along and between Main Street, West Ave., and Stone Road) as a list of ordered pairs of nodes. This list of ordered pairs assumes that graph G is undirected, so that ordered pairs (1,2) and (2,1) are redundant. However, some operations and/or metrics may use a directed graph (or may include additional data such as elevation). Transforming graph objects between directed and undirected states is understood by those of ordinary skill in the art.

Mapping GPS Data to Graph G to Show Potential Paths

After the graph G is created, multiple GPS data time-series can be mapped onto the graph G to show potential paths that have been traversed over the represented street network. Each such path that has been traversed by a user is defined by a time-series of GPS data (referred to herein as a "GPS track"). A GPS track may represent a path taken by a user during a walk, run, biking workout, or other monitored traversal of the route. For every GPS data point for a GPS track 290, a network computing device (e.g., server 230) computes the nearest node, forming a list. To limit this search for computational efficiency, it may be preferable to only use nodes inside a bounding box 295 formed from the minimums and maximums of the longitude and latitude of track 290, respectively. For larger activities, it may be more computationally efficient to form a bounded polygon made up from a simplified GPS sequence. For simplification, Ramer Douglas Puekcer (RDP) algorithm or other algorithm known or developed in the art may be used to form the bounding box. For forming the polygon from the points, the linestring.buffer function in the Shapely python library or other mechanism known or developed in the art may be used.

According to one embodiment, in order to map a GPS track to the graph G, a list or sequence of nodes of equal length to the number of GPS points is formed. Each node on the list represents the node on the graph G that the user 205 was closest to at the time the GPS coordinates were determined by the GPS-enabled device 210. For example, consider a user moving from node N1 to node N2 of FIG. 9 wherein twenty GPS data points are collected as the user moves from node N1 to node N2. The earlier-in-time GPS data will show that the user is closest to node N1, and therefore each of these GPS data points (i.e., latitude and longitude coordinates) is associated with node N1. The later-in-time GPS data will show that the user is closest to node N2, and therefore each of these GPS data points is associated with node N2. At some point as the user moves in-between node N1 and node N2 a transition is made from the GPS data point being associated with node N1 to the GPS data point being associated with node N2. In the example where twenty GPS data points are collected between node N1 and node N2, a data point near the eleventh GPS data point may represent this transition from node N1 to node N2, assuming the user is moving at a constant pace. Accordingly, the list of GPS data points as the user moves from node N1 to node N2 in this example would be as follows: 11111111112222222222.

When a user traverses across several nodes during a GPS track, the list of GPS nodes will be redundant because the closest node only occasionally changes within the typical GPS data collection interval (e.g., 1 second). These redundant nodes can be advantageously removed. In particular, a series of the same node can be reduced to a single instance. For example, if GPS track 290 in FIG. 9 renders the node list 1111112222333355554444445552222211111, the node list can be reduced to (1,2,3,5,4,5,2,1).

After preparing the sequence of nodes (1,2,3,5,4,5,2,1) as explained in the previous paragraph, the sequence of nodes can be transformed into to a list of edges (i.e., node pairs, each node pair representing a traversal from one node to the next. For example, the sequence of nodes (1,2,3,5,4,5,2,1) can be transformed into the following list of edges:

p=((1,2),(2,3),(3,5),(5,4),(4,5),(5,2),(2,1))

where p is the path (or list of edges) describing the activity of the user on GPS track 290. A path p created from a GPS track 290 may also be referred to herein as an "activity track". In the exemplary embodiment of p above, it will be noted that the second coordinate in a particular coordinate pair is the same as the first coordinate in the immediately following coordinate pair.

Comparing the list of edges for GPS track 290 (i.e., (1,2),(2,3),(3,5),(5,4),(4,5),(5,2),(2,1)) to the graph G of FIG. 9 (i.e., G=(1,2), (2,3), (2,4), (4,5), (5,6)), it will be noted that two edges in path p do not exist in graph G. In particular, the graph G does not show the (3,5) edge or the (5,2) edge. The reason for this may be one of two reasons: (i) an error occurred with the GPS data, or (ii) there is a new path between the nodes that has yet to be defined in the graph G. Various algorithms may be utilized to determine whether edges in a GPS track are due to an error in GPS data or indicate a previously unknown edge which calls for an update in the graph.

As noted previously, GPS data can be associated with a specific workout, user, and other information. Similarly, the path p for a GPS track may also be associated with a specific workout, user, or other information. In some cases, a path may represent an aggregation of GPS tracks for a user for a period, say a week or a year, or a single workout.

Constructing a Path Matrix and Suggestion Box

Mapping of time-series GPS data for GPS track 290 onto the street network 280 of FIG. 9 produced a path two sets of data, including (i) the part of the path on graph G (which may be referred to herein as "identified" edges or connections), and (ii) parts of the path not on graph G that represent either potential new paths or GPS error (which may be referred to herein ad "unidentified" edges or connections). In order to determine whether the unidentified edges not on graph G represent either potential new paths or GPS error, the sequence of nodes for the GPS track 290 are stored in a "path matrix" 246 (which may also be referred to herein as "PM") and suggestions for new edges in the graph G are stored a "suggestion matrix" 248 (which may also be referred to herein as "suggestion box" or "SB"). As explained in further detail below, the path matrix 246 and the suggestion box 248 may be an undirected graph from which computations of aggregate activity data can also be performed. As also explained in further detail below, a number of queries can be answered using PM 246. A client computing device 250 can provide a set query criteria to 252 to the server 230 of activity tracking system 200, such as, what are the most popular routes (i.e., the most frequented routes) for users having certain demographics. Graph encoding system 236 can filter PM 246 based on the criteria. Edges that meet the criteria can be returned along with various metrics. In some cases, the edges can be mapped to visual representation of a map with color coding to visually identify particular edges meeting various criteria (e.g., a portion of a road corresponding to a most popular edge indicated in green, etc.)

The Path Matrix

An exemplary embodiment of a path matrix (PM) is shown in FIG. 10. The path matrix 246 in FIG. 10 is associated with the graph G, and includes information from the GPS track 290 of FIG. 9. The path matrix 246 is generally an m×n matrix where the m rows represent edges over a particular area of a graph, and n columns represent an activity track (for a certain day, a particular workout or other period). Accordingly, the rows are defined by edge 1 (1,2), edge 2 (2,3), edge 3 (2,4), edge 4, (4,5), and edge 5 (5,6). Again, these are the possible edges known to the system based on graph G. The columns are defined by some number of activity tracks. The example activity track discussed above (i.e., p=((1,2),(2,3),(3,5),(5,4),(4,5),(5,2),(2,1))) is represented as the first column in the PM 246 as shown in FIG. 10. The number of times one of the edges from the graph G was traversed during the activity track is represented in the associated row of the column. For example, for activity track 1 (i.e., "activity 1") in the path matrix of FIG. 10 (i.e., p=((1,2),(2,3),(3,5),(5,4),(4,5),(5,2),(2,1))), edge 1 was traversed twice (i.e., p included (1,2) and (2,1)), edge 2 was traversed once (i.e., (2, 3)), edge 3 was not traversed, edge 4 was traversed twice (i.e., (1,2) and (2,1)), and edge 5 was not traversed. Note that both (1,2) and (2,1) in the path can be aggregated in a score of "2" since the this edge was traversed twice in the same activity. In another embodiment, path matrix 246 may be applied to a directed graph such that there would be an entry for edge (1,2) and an entry for (2,1) in the first column. A number of additional activity tracks are also included in the path matrix, with one activity track represented in each column.

The Suggestion Box

An exemplary embodiment of a suggestion box (SB) is shown in FIG. 11. The suggestion box 248 generally includes a set of m×m sparse matrices, each one representing the 'suggestions' of a potential connection for graph G from an existing activity. Each sparse matrices includes an equal number of rows and columns (i.e., m×m), where the number is equal to the number of nodes in the graph. Therefore, for the graph G of FIG. 9 with six nodes, suggestion box 248 is a 6×6 matrix.

With continued reference to FIG. 11, suggestion box 248 includes two data entries, one for node combination (5,2) and another for node combination (3,5). These two node combinations represent both of the unknown edges (i.e., edges not currently included in the graph G) from the GPS track 290 of FIG. 9. Accordingly, each of these unknown edges is a "suggestion" in the suggestion box 248. Suggestion (5, 2) is represented by a "1", and suggestion (3, 5) is also represented by a "1" in the suggestion box 248 of FIG. 11. These "suggestions" are in the suggestion box 248 are for additional edges that could be added to the graph G, based on data collected from activity track 1. Additional data entries may be made to the suggestion box 248 based on other activity tracks (e.g., activity tracks 2 and 3 in the path matrix 246).

Since the path matrix 246 is, in some embodiments, an undirected graph, the matrices with suggestion box 248 can be sparse, and, by convention, upper triangular. This means that all suggested edges can be encoded with an increasing row-column format.

Operations on the Path Matrix

Mathematical operations may be performed on the PM in order to determine at least one property for the graph G. Quick sparse computations can be performed to create a variety of aggregate information. There are many combinations of operations that can be performed, including, but not limited to, the exemplary operations discussed in the following paragraphs, with reference to FIG. 12.

A summary of all activity within the graph G can be obtained by the inner product PM*v, where v is a vector where each element is one (i.e., vector v is a v×1 matrix). The vector v is of length n, which is equal to the number of activity paths in the path matrix 246 (i.e., the number of columns in PM 246). Accordingly, because v=n the PM may be multiplied by the vector v. This operation of linear algebra produces a sum across all columns, producing a vector of length m (number of edges). This operation may be used to obtain summary information from the path matrix on only a subset of activities. In particular, the operation can be performed with a vector where only the elements representing the desired activities have a "1".

Figure 12:
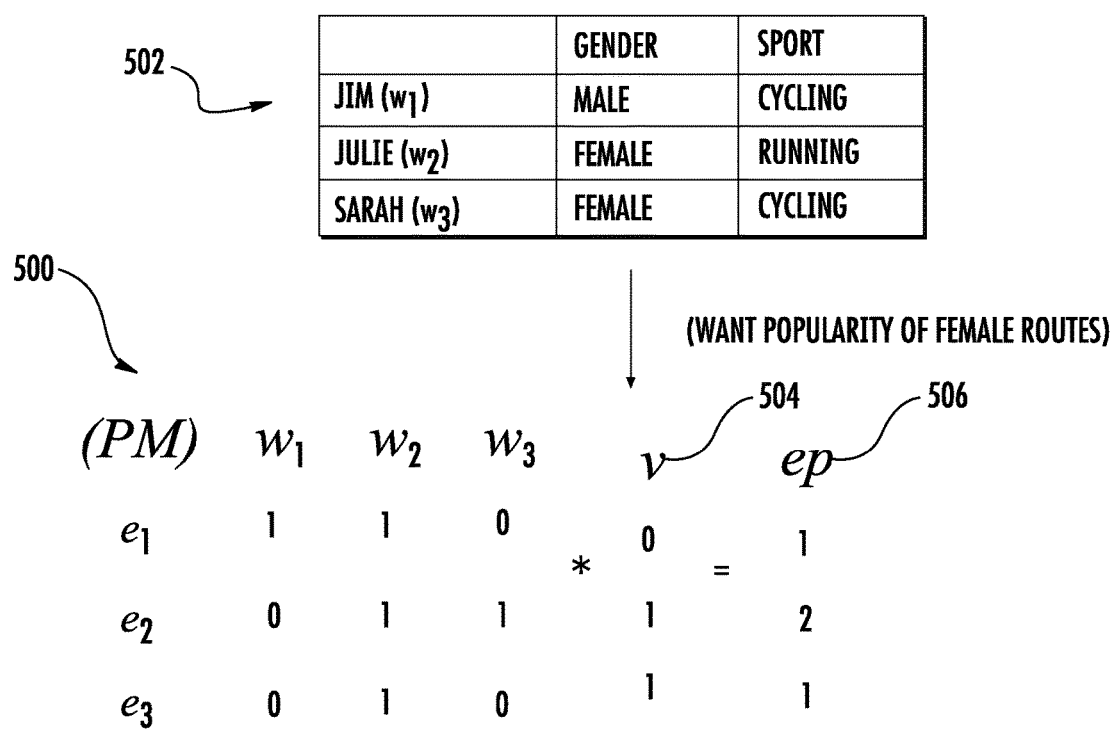
FIG. 12 illustrates an exemplary embodiment of an operation performed on the path matrix of FIG. 10 to render an edge property vector.

By multiply the PM (m×n matrix) by a vector v, custom edges properties may be created, representing aggregate data of any of various types. To illustrate an example, consider the path matrix (PM) 500 in FIG. 12 created by applying three paths to a graph, each path corresponding to a different workout. PM 500 has 3 edges (i.e., $e_1$, $e_2$, and $e_3$, which are node combinations) and 3 workouts ($w_1$, $w_2$, and $w_3$, which are three activity tracks). Each workout was performed by one of three different people having profile data 502. To determine the edge that is most popular with women, we multiply the PM 500 by the vector 504 (i.e., vector (0,1,1)). The first row of vector 504 is negative and therefore a "0" because, as shown in profile data 502, the person who performed workout $w_1$ is a male; rows two and three of vector 504 are positive and therefore a "1" because workouts $w_2$ and $w_3$ were performed by females. When PM 500 is multiplied by vector 504, the result is another vector of edge properties 506 (i.e., ep=(1,2,1)) as shown in FIG. 12. The highest value of vector 506 is found in row two, making the second edge $e_2$ the most popular edge.

Based on the foregoing example, it can be seen that creating a vector 504 based on information in the profile data, and then multiplying the path matrix 500 by that vector, results in a vector with edge properties that is capable of identifying most used and least used edges by the demographic represented by the user profile vector 504. As another example, if one wanted to find the relative popularity of the edges with only cyclists, PM 500 of FIG. 12 could be multiplied by vector (1,0,1) (which represents the cycling workouts in the example of FIG. 12).

In addition to determining most and least popular edges for a group of activity tracks, the multiplication operation on the path matrix may also be used to provide summary information about which activity tracks utilized a particular edge or group of edges. In particular, summary information about a particular edge, or group of edges can be obtained by the operation PM×v where v is a vector of length n made up of is for the desired edges. For example, to find all the workouts of $e_2$ in FIG. 12, multiply PM by (0,1,0), which would give the vector ep (0,1,1). This vector ep (0,1,1) shows that only the 2nd and 3rd workout traversed edge $e_2$.

As described above, the system 200 not only provides for generation of graphs defined by nodes and edges, but also allows for mapping of GPS data to the created graphs. When GPS data from one or more additional GPS tracks is mapped to an existing graph, additional paths may be determined for an existing graph. Additionally, when activity track data is stored by the system (e.g., GPS track data stored within a path matrix 246 including node and edge information for various GPS tracks), the system 200 may be used to quickly and conveniently produce various types of demographic or related information (e.g., route popularity for any of various groups and related data). Combinations of the above-described operations using various vectors, along with a database of activities with useful attributes, can lead to a large variety of useful information, such as age and gender profile for particular streets, graphs of when particular members activities overlap, etc.

Various Embodiments

Portions of the methods described herein may be implemented in suitable software code that may reside within ROM 343, RAM 345, hard drive 347, database 350, data source 360 or a combination thereof. In some embodiments, computer instructions implementing an embodiment disclosed herein may be stored on a direct access storage device (DASD) array, magnetic tape, floppy diskette, optical storage device, or other appropriate computer-readable storage medium or storage device. A computer program product implementing an embodiment disclosed herein may therefore comprise one or more computer-readable storage media storing computer instructions translatable by CPU 341 to perform an embodiment of a method disclosed herein.

In an illustrative embodiment, the computer instructions may be lines of compiled C++, Java, or other language code. Other architectures may be used. For example, the functions of server computer 340 may be distributed and performed by multiple computers in enterprise computing environment 330 or in a cloud in network computing environment 300. Accordingly, each of the computer-readable storage media storing computer instructions implementing an embodiment disclosed herein may reside on or accessible by one or more computers in enterprise computing environment 330 or in a cloud in network computing environment 300.

Routines, methods, steps, operations or portions thereof described herein can be implemented through control logic, including computer executable instructions stored on a computer readable medium, hardware, firmware or a combination thereof. The control logic can be adapted to direct an information processing device to perform a set of steps disclosed in the various embodiments. Some embodiments may be implemented by using software programming or code in one or more digital computers, by using application specific integrated circuits, programmable logic devices, field programmable gate arrays, optical, chemical, biological, quantum or nanoengineered systems, components and mechanisms. Based on the disclosure and teachings provided herein, a person of ordinary skill in the art will appreciate other ways and/or methods to implement the invention.

Computer executable instructions or code can be stored in a computer-readable medium and can be operated on by a processor to permit a computer to perform functions, steps, operations, methods, routines, operations or portions thereof described herein. Any suitable language can be used including C, C++, Java, JavaScript, assembly language or other programming or scripting code. Different programming techniques can be employed such as procedural or object oriented. In an embodiment, HTML may utilize JavaScript to provide a means of automation and calculation through coding.

Any particular step, operation, method, routine, operation or portion thereof can execute on a single computer processing device or multiple computer processing devices, a single computer processor or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc. The routines can operate in an operating system environment or as stand-alone routines.

A "computer-readable medium" may be any type of data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer readable medium can be, by way of example, only but not by limitation, an electronic, magnetic, optical, electromagnetic, infrared, or semiconductor system, apparatus, system, device, or computer memory. The computer readable medium may include multiple computer readable media storing computer executable instructions, such as in a distributed system or instructions stored across an array.

A "processor" includes any hardware system, hardware mechanism or hardware component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Embodiments can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, memory (e.g., primary or secondary memory such as RAM, ROM, HD or other computer readable medium for the persistent or temporary storage of instructions and data) and one or more input/output ("I/O") device(s). The I/O devices can include a keyboard, monitor, printer, electronic pointing device (for example, mouse, trackball, stylus, etc.), touch screen or the like. In embodiments, the computer has access to at least one database on the same hardware or over the network.

Steps, operations, methods, routines or portions thereof of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with network and other communications protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and A and B are both true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

In the foregoing specification, the invention has been described with reference to specific embodiments. However, one of ordinary skill in the art appreciates that various modifications and changes can be made without departing from the scope of the invention. Accordingly, the specification, including the Summary and Abstract, and figures are to be regarded in an illustrative rather than a restrictive sense, and all such modifications are intended to be included within the scope of invention.

What is claimed is:

1. A method for generating a graph, the method comprising:
    receiving GPS data points for a plurality of GPS tracks;
    simplifying the GPS tracks to provide GPS data for simplified GPS tracks, wherein simplifying the GPS tracks includes reducing the GPS data points for each of the GPS tracks by applying an iterative end-point fit algorithm to said GPS track, the iterative end-point fit algorithm using an error parameter that is dependent upon a sport associated with said GPS track, and then identifying points of greater curvature in the GPS tracks;
    clustering the identified points of greater curvature;
    determining a plurality of nodes for the graph based on the clustered identified points of greater curvature in the GPS tracks; and
    determining a plurality of connections between the nodes, the nodes and the connections defining the graph.

2. The method of claim 1 wherein determining the connections between the nodes includes determining a sequence of closest nodes based on the received GPS data points for each of the GPS tracks.

3. The method of claim 2 wherein determining the connections between the nodes further includes removing redundant nodes from the sequence of closest nodes.

4. The method of claim 1 wherein the GPS data points for the GPS tracks are received over a network from a plurality of GPS-enabled devices during fitness activities.

5. The method of claim 1 further comprising defining at least one primary connection between a pair of nodes, and defining at least one secondary connection between the pair of nodes.

6. The method of claim 5 wherein defining the at least one secondary connection between the pair of nodes comprises interpolating a same number of GPS points between the pair of nodes and clustering the GPS points in order to group the GPS points into distinct paths.

7. The method of claim 5 wherein defining the at least one secondary connection between the pair of nodes comprises defining a plurality of intermediate nodes between the pair of nodes.

8. The method of claim 1 further comprising receiving additional GPS data points for an additional GPS track related to the defined graph, determining that at least one additional connection exists between the nodes of the graph based upon the additional GPS data points, and updating the graph to include the at least one additional connection.

9. A non-transitory computer readable medium containing instructions for generating a graph by:
receiving GPS data points for a plurality of GPS tracks;
simplifying the GPS tracks by reducing the GPS data points for each of the GPS tracks by applying an iterative end-point fit algorithm to said GPS track, the iterative end-point fit algorithm using an error parameter that is dependent upon a sport associated with said GPS track;
identifying points of greater curvature in the GPS tracks;
clustering the identified points of greater curvature;
determining a plurality of nodes for the graph based on the clustered identified points of greater curvature in the GPS tracks; and
determining a plurality of connections between the nodes, the nodes and the connections defining the graph.

10. The computer readable medium of claim 9 wherein identifying the points of greater curvature includes simplifying the GPS tracks to produce GPS data for simplified GPS tracks and clustering the GPS data for the simplified GPS tracks to identify the points of greater curvature.

11. The computer readable medium of claim 9 wherein determining the connections between the nodes includes determining a sequence of closest nodes based on the received GPS data points for each of the GPS tracks.

12. The computer readable medium of claim 11 wherein determining the connections between the nodes further includes removing redundant nodes from the sequence of closest nodes.

13. The computer readable medium of claim 9 wherein the GPS data points for the GPS tracks are received over a network from a plurality of GPS-enabled devices.

14. The computer readable medium of claim 9 further containing instructions for generating a graph by defining at least one primary connection between a pair of nodes, and defining at least one secondary connection between the pair of nodes.

15. The computer readable medium of claim 14 wherein defining the at least one secondary connection between the pair of nodes comprises interpolating a same number of GPS points between the pair of nodes and clustering the GPS points in order to group the GPS points into distinct paths.

16. The computer readable medium of claim 14 wherein defining the at least one secondary connection between the pair of nodes comprises defining a plurality of intermediate nodes between the pair of nodes.

17. A method for generating a graph, the method comprising:
receiving GPS data points for a plurality of GPS tracks, the GPS data points for the GPS tracks received from a plurality of GPS-enabled devices during fitness activities;
identifying points of greater curvature for each of the plurality of GPS tracks and simplifying the GPS tracks to the identified points of greater curvature, wherein simplifying the GPS tracks to the identified points of greater curvature comprises (i) defining an error parameter, (ii) defining a line extending between two points of a subset of GPS data points for each of the GPS tracks, (iii) determining a point of the subset that is a farthest distance from the defined line, and (iv) maintaining the determined point as a point of greater curvature if the farthest distance is greater than the defined error parameter;
clustering the GPS data points identified as the points of greater curvature;
determining a plurality of nodes for the graph based on the clustered GPS data points;
determining a sequence of closest nodes for a plurality of GPS data points for each of the GPS tracks;
reducing the sequence of closest nodes for each of the GPS tracks by removing redundant nodes from the sequence; and
determining a plurality of connections between the nodes based on the reduced sequence of closest nodes for each of the GPS tracks.

18. The method of claim 17 further comprising defining at least one primary connection between a pair of nodes, and defining at least one secondary connection between the pair of nodes.

* * * * *